United States Patent [19]

Brosius et al.

[11] 4,421,213
[45] Dec. 20, 1983

[54] HYDRODYNAMIC TORQUE-TRANSFER UNIT, ESPECIALLY A HYDRODYNAMIC BRAKE

[75] Inventors: Klaus Brosius, Heidenheim; Berthold Herrmann, Gerstetten, both of Fed. Rep. of Germany

[73] Assignee: Voith Getriebe KG, Fed. Rep. of Germany

[21] Appl. No.: 316,524

[22] Filed: Oct. 29, 1981

[30] Foreign Application Priority Data

Oct. 30, 1980 [DE] Fed. Rep. of Germany ....... 3040790

[51] Int. Cl.³ ............................................. F16D 57/02
[52] U.S. Cl. ..................................... 188/296; 303/61
[58] Field of Search .................. 60/343; 188/290, 294, 188/296, 299, 310; 303/11, 61

[56] References Cited

U.S. PATENT DOCUMENTS 4,343,383  10/1982  Brosius et al. ...................... 188/296

*Primary Examiner*—Duane A. Reger
*Attorney, Agent, or Firm*—Ostrolenk, Faber, Gerb & Soffen

[57] ABSTRACT

The invention concerns a hydrodynamic torque transfer unit, particularly in the form of a hydrodynamic brake. Flow to the inlet of the working chamber of the transfer unit is controlled by an inlet valve movable between a closed, partially open and fully open position. A first piston moves the valve between its positions. A change over device cooperates with the first piston. The change over device includes a second piston. A first pressure chamber is defined between the first and second pistons. A second pressure chamber is defined behind the second piston. Initially, the first pressure chamber is pressurized, driving the first piston and thus the inlet valve to the fully open position. The second piston is moved by pressurization of the second pressure chamber to cut off pressure to the first pressure chamber and to instead cause communication between the first pressure chamber and the working chamber. Typically, the working chamber is at reduced pressure which thereby permits depressurization of the first pressure chamber. A spring then returns the inlet valve back toward the intermediate open position. The second piston has been shifted by pressurization of the second pressure chamber to prevent the first piston and thus the inlet valve from returning to the fully closed position, and the inlet valve therefore remains at the intermediate open position. There may be an outlet control which also regulates the outlet flow from the working chamber. The first pressure chamber may communicate with the working chamber through the outlet control.

27 Claims, 3 Drawing Figures

HYDRODYNAMIC TORQUE-TRANSFER UNIT, ESPECIALLY A HYDRODYNAMIC BRAKE

BACKGROUND OF THE INVENTION

The invention is an improvement upon the hydrodynamic torque-transfer unit disclosed in U.S. application Ser. No. 208,787, filed Nov. 20, 1980, now U.S. Pat. No. 4,343,383 incorporated herein, and the corresponding German applications on which that U.S. application is based. The previous disclosure is of a hydrodynamic torque-transfer unit, especially a hydrodynamic brake, that seeks to obtain the highest possible ratio between the largest and smallest transferable torque and that will consequently react very rapidly to a command to change from idle to low torque. The unit of the previous disclosure attains this object by conveying a short, temporary filling stroke to the working fluid chamber of the hydrodynamic unit when such an activating command is received. This filling stroke is automatically started by a control device that activates the intake valve to the working fluid chamber of the unit, with the duration of the stroke being precisely varied in accordance with momentary torque requirements. It is thus possible to very rapidly fill the working chamber with working fluid to only a very slight extent when necessary. This results both in high responsiveness and in very low minimum torque, i.e. minimum braking moment, in the case of a brake.

The above application discloses various embodiments of the hydrodynamic torque-transfer unit described above. The following characteristics are common to all of thess embodiments. Each has an activating control, a pedal, for example, which provides a nominal value to a working chamber outlet-control that establishes the necessary torque. The activating control is preferably designed in accordance with DE-OS 28 55 654, corresponding to U.S. Pat. No. 4,276,970. The activating control is also coupled to a two-stage pilot device that opens the intake valve. This system is designed so that when the pedal is slightly depressed, pressure is applied to a pressure-medium line ("Stage I" of the activating command) and, as the pedal is further depressed, pressure is applied to a second pressure-medium line ("Stage II" of the activating command).

The unit of the previous disclosure has been tested with positive results. The system having the pilot device is, however, comparatively expensive and is subject to failure under certain conditions.

SUMMARY OF THE INVENTION

The object of the present invention is to improve the control of the intake valve of the hydrodynamic unit of the previous disclosure to the extent that only one simple command from the activating control will be required. Therefore, only one simple activating-deactivating control will be required, while the desirable properties of the unit of the previous disclosure will be retained.

This purpose is achieved by means of the invention. The invention concerns a hydrodynamic torque transfer unit, such as a hydrodynamic brake. The transfer unit includes a housing having a working chamber in it, with a stator and cooperatng rotor. The level of working fluid in the working chamber determines the torque of the unit. There is a working fluid inlet and a working fluid outlet from the working chamber. An inlet valve connected to the inlet regulates the outlet flow of working fluid. The inlet valve moves between a rest, intermediate opened and fully opened condition. There is a control device including a control element that is connected to the valve for moving the valve among its various conditions. The control element is movable from a respective rest position, corresponding to the closed position of the valve, through an intermediate activated position, corresponding to the partially open condition of the valve and finally to a fully activated position, corresponding to the valve fully activated position.

There is a first pressure chamber behind this first control element. When the first pressure chamber is pressurized, the first control element is moved from the rest position to the fully activated condition. A change over device is provided for permitting discharge of pressure from the first pressure chamber. To this end, the change over device initially connects the first pressure chamber with a source of pressure medium. The change over device is moved to cut off this connection and to thereafter connect the first pressure chamber with the working chamber, whereby the first pressure chamber will be exposed to the pressure of the working chamber. If the pressure of the working chamber is low enough, the first pressure chamber will then discharge. The change over device also includes a preventing means that prevents the first control element from returning from the fully activated position beyond the intermediate activated position.

Operation of the change over device is controlled by the activator for the unit, e.g. the foot pedal of a brake. This causes the initial pressurization of the first pressure chamber and also causes the movement of the change over device to permit depressurizing of the first pressure chamber. It also causes movement of the prevent means to the position for blocking return of the first control element.

In the preferred embodiment, the first control element is a first piston. The change over device is comprised of a second piston which cooperates with the first piston. The first pressure chamber is defined between the first and second pistons. A second pressure chamber behind the second piston is pressurized to drive the second piston toward the prevent position and this also moves the second piston to separate the first pressure chamber from the source of pressure medium and to connect the first pressure chamber in a manner to cause communication between the first pressure chamber and the working chamber. Biasing means normally bias the inlet valve back toward the rest position, whereby upon depressurization of the first pressure chamber, the inlet valve is returned to the partially activated position where it is prevented from moving further back to the rest position by the prevent means.

As it is desirable to first move the first control element to the valve fully activated position before the change over device permits depressurization of the first pressure chamber, means is provided, such as a throttle, for delaying pressurization of the second pressure chamber until after the first pressure chamber has been pressurized and the first control element has shifted.

Additionally, there may be an outlet control from the working chamber and the outlet control determines how much working fluid leaves the working chamber. The first pressure means may be connected with the working chamber through the outlet control.

Both pressure chambers in the device that controls the intake valve are first supplied with pressure medium in response to an activating command. This was done previously. Afterward, however, a change over device connects a first one of the pressure chambers to the working chamber of the hydrodynamic unit. Especially when the working chamber outlet control has established only a low torque, only a relatively low pressure has been built up in the working chamber at that instant. In accordance with the invention, therefore, the first pressure chamber will discharge into the working chamber of the hydrodynamic unit, while the filling stroke can be just as rapid and precisely varied in duration as before. The hydrodynamic unit has also been considerably simplified. When the activating control and the outlet control establish a higher torque, the resulting higher pressure in the working chamber will propagate into the first pressure chamber in the intake control, where it will trigger the intake valve to move from half open to completely open.

This process is thus initiated by the hydrodynamic unit itself. It is no longer necessary, as before, for the activating control to provide a "Stage II" command.

The system of the invention also works in the opposite direction. When the activating control establishes a lower torque again, and the fluid pressure in the working chamber is lower, the intake valve returns from its open to its half open position.

Another advantage of the invention is that the intake valve goes from half open to fully open, or vice versa, less abruptly, which completely or at least in significant part eliminates the previous tendency of the unit to oscillate.

Other objects and features of the invention will be apparent from the following description considered with reference to the drawings.

DESCRIPTION OF THE PREFERRED EMBODIMENTS

Figure 1:
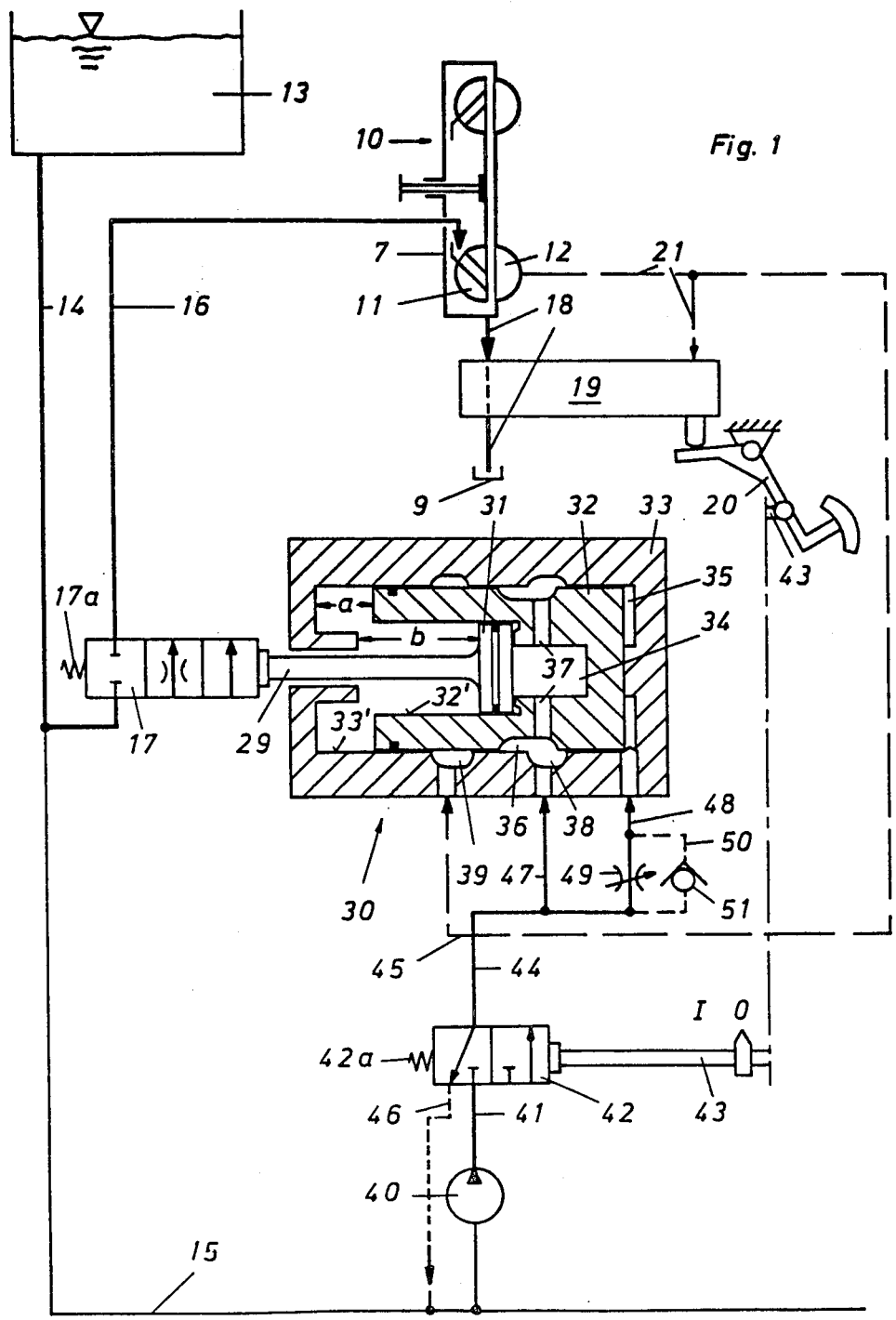
FIG. 1 diagrammatically shows a hydrodynamic unit according to the invention in the form of a brake, and its controls.

FIG. 1 shows a hydrodynamic brake 10. It includes an enclosed housing 7, a bladed rotor 11 rotatably mounted inside the housing, and a bladed stator 12 secured to the housing against rotation and positioned next to the rotor for cooperating therewith in the working chamber of the housing 7. The rotor and stator and the housing together define a toroidal working chamber. The quantity of working fluid in the housing is variable for varying the torque of the brake.

A low-pressure line 14, 15 leads from a hydraulic or working fluid pressure reservoir 13. An intake line 16 branches off line 14, 15 and communicates through an inlet valve 17 to the housing 7 of the brake 10. An outlet line 18 leads from the housing 7 through an outlet-control valve 19, which is preferably of the type disclosed in U.S. Pat. No. 4,276,970 incorporated herein. A brake pedal 20 generates a nominal value, in the form of a signal corresponding to the level of torque required of the brake at any particular time, and an actual value, in the form of a signal with a value that depends on the instantaneous brake moment (obtained from test-pressure line 21), to outlet-control valve 19. Outlet line 18 from housing 7 ends in fluid-collector 9. From here, the fluid can be returned through a fluid cooling radiator, not shown, to the reservoir 13.

To ensure satisfactory heat conduction from brake 10 and to ensure that the brake will react as rapidly as possible to control commands, lines 14, 16 and 18 and valves 17 and 19 have large flow cross-sections. The closure means on intake valve 17 can be a rotating flap, a sleeve (as in DE-PS No. 27 57 204), or another similarly functioning device. It is only essential that the closure be able to assume an intermediate state (schematically shown in the middle of valve 17), between the completely closed (left in valve 17) and completely open (right in valve 17) positions, at which valve 17 will provide access to only part of its complete flow cross-section. Piston rod 29 is a component of a two-stage hydraulic control device 30 and the piston acts on valve 17. The rod 29 can assume three different positions corresponding to the three positions of the valve 17.

Control device 30 has two pistons 31 and 32. Piston 31 is fixed to piston rod 29. The piston 31 and the housing 33 are respectively sized so that the piston 31 has a long stroke b. It has a smaller external diameter than that of piston 32. Piston 32 has a bore 32' defined in it in which piston 31 is slidingly received. Piston 32 cooperates with piston 31 to define a pressure chamber 34 behind piston 31 in the bore of piston 32. Piston 32 has the external diameter of the inside bore walls 33' of device housing 33. In contrast to piston 31, the piston 32 and the housing 33 are respectively sized so that the piston 32 has a short stroke a. The piston 32 in housing 33 defines a second, larger diameter pressure chamber 35 behind piston 32, and the pressure surface of piston 32 in chamber 35 is greater than the pressure surface of piston 31 in chamber 34.

When housing 33 is not pressurized, a spring 17a closes intake valve 17 (moves it to the right in FIG. 1) so that pistons 31 and 32 will be at rest, with piston 32 in contact with the rear wall of housing 33 and piston 31 in contact with piston 32 and the chambers 34 and 35 being of minimum size. This is the situation illustrated in FIG. 1.

The peripheral exterior of piston 32, to the right of the sleeve portion of piston 32 around piston 29, 31, has an annular groove 36 defined in it that is connected to pressure chamber 34 by transverse bores 37. There are two axially spaced apart, annular grooves 38 and 39 in housing bore 33' for cooperating with groove 36 as piston 32 travels in bore 33'. Smaller pressure chamber 34 will be connected through transverse bores 37 and annular groove 36 either with annular groove 38 when piston 32 is at rest (to the right) or with annular groove 39 when piston 32 is in the opposite, operating position (to the left). Piston 32 cooperates with housing 33 to provide a change over device.

A pump 40 charges pressure chambers 34 and 35 with pressure medium, e.g. hydraulic or other working fluid, by withdrawing it from low-pressure line 15 and supplying it to high-pressure line 41. Line 41 opens into a pilot valve 42 that is activated, by a mechanical linkage 43, that is operated, for example, when pedal 20 is depressed. A pressure-medium line 44 and a discharge line 46 that leads back to low-pressure line 15 are both connected through pilot valve 42.

When pedal 20 is not depressed, a spring 42a holds pilot valve 42 at rest, the illustrated condition, so that pressure-medium line 44 is connected to discharge line 46 and high-pressure line 31 is closed off. This keeps pressure in both of chambers 34 and 35 reduced.

When pedal 20 is depressed even slightly, valve 42 is moved into position I, i.e. it shifts to the left in FIG. 1, so that pressure-medium line 44 is connected with high-pressure line 41. A branch line 47 leads from pressure-medium line 44 directly to annular groove 38 and chamber 34. Another branch 48 leads from pressure-medium line 44 through throttle 49 to pressure chamber 35. Both of these connections from pressure line 44 are always open. A discharge line 50 that bypasses throttle 49 contains a check valve 51 that opens when pressure chamber 35 discharges during Stage O, at which valve 42 is to the right in FIG. 1, for allowing piston 32 to return rapidly to its rest position.

When a brake command is given, by depression of pedal 20, pilot valve 42 is shifted to the left in FIG. 1 to Position I and the following sequence of events occurs. Pressure medium arrives through lines 44 and 47 and through grooves 38 and 36 and channels 37 into smaller pressure chamber 34. This causes the piston 31 to rapidly travel to the left through its full stroke b, which opens intake valve 17 to its greatest extent. Pressure medium simultaneously arrives more gradually through throttle 49 into larger pressure chamber 35 so that piston 32 slowly moves left to its operating position. This shifting of piston 32 separates smaller pressure chamber 34 and bores 37 from annular groove 38 and from pressure-medium lines 44 and 47 and connects them instead with annular groove 39 in bore wall 33' of housing 33. Groove 39 is connected through a line 45 and through test-pressure line 21 to the working fluid chamber of brake 10. Assuming that brake pedal 20 has been depressed only slightly, only a low braking moment will be required, so that the pressure in the working chamber in housing 7 will be low. Still highly pressurized pressure chamber 34 will now be able to discharge into the brake working chamber. The resulting pressure reduction in chamber 34 permits the piston 31 to be shifted to its intermediate position, i.e. it travels to the right to rest against piston 32 under the influence of spring 17a. The shifting of piston 32 due to the pressurizing of chamber 35, coupled with the spring biased return of piston 31, opens intake valve 17 approximately half-way. Since all of these events can occur in a very short time, brake 10 can undergo a filling stroke in a short time in response to a "low braking moment" command. The duration and hence the intensity of the filling stroke can be varied by controlling throttle 49, which will change the operating speed of piston 32 and thus vary the time before change over.

From the intermediate position, if brake pedal 20 and outlet-control valve 19 establish a higher braking moment, the pressure in the brake working chamber will be higher. With the piston 32 already shifted through its stroke a, the pressure in the working chamber will arrive through line 45 and annular grooves 39 and 36 without delay. As long as the pressure in chamber 34 is high enough to resist the force of spring 17a, piston 31 will be biased from the intermediate position (to the left in FIG. 1) into its operating position, completely opening the intake valve 17 again.

When brake pedal 30 is in Position O and the unit is in the condition illustrated in FIG. 1, and the brake pedal is rapidly depressed to any great extent from Position O, as stated above, intake valve 17 will then go rapidly from its closed (to the right) into its completely open (to the left) state, remaining there because the necessary pressure will build up through line 45 in smaller pressure chamber 34.

Figure 2:
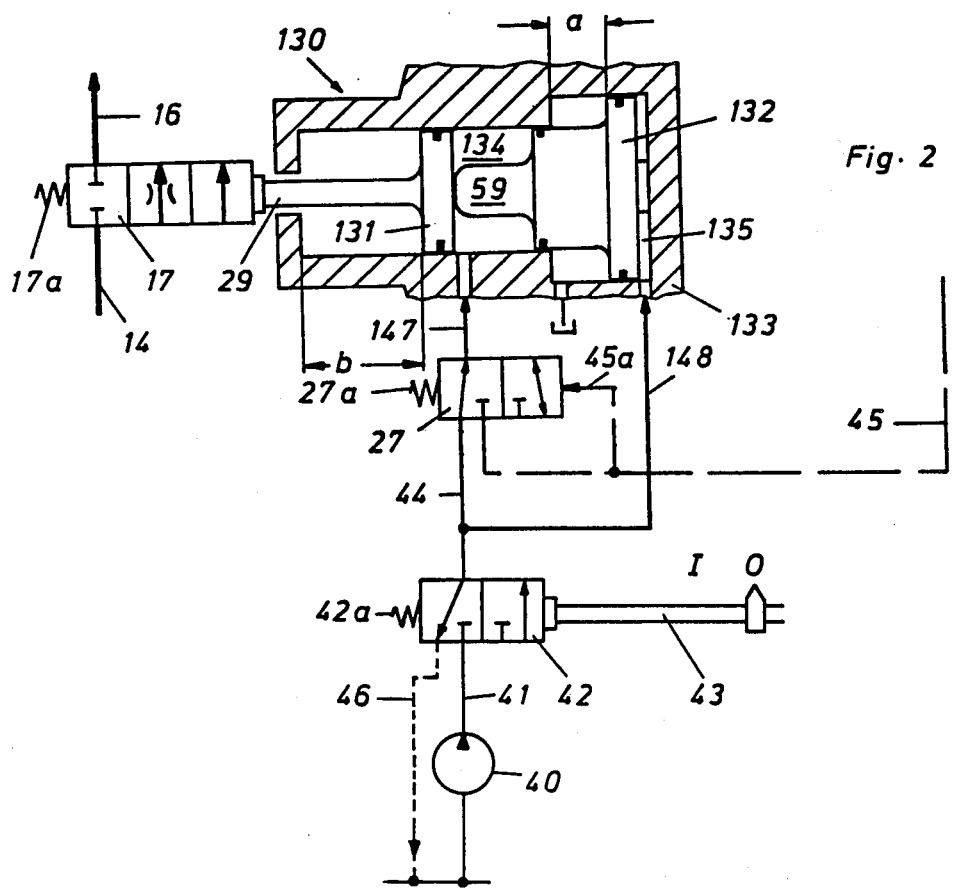
FIG. 2 shows a detail of a variation of the system shown in FIG. 1, and FIG. 3 diagrammatically shows a hydrodynamic brake as in FIG. 1, but with a different system of control lines.

The elements in FIG. 2 that are the same as those in FIG. 1 are labeled with the same reference numerals. Some unchanged elements, however, like brake 10, reservoir 13, brake pedal 20, and outlet-control valve 19, have been omitted from FIG. 2. Other elements different from those in FIG. 1, but corresponding in function, have been correspondingly numbered with reference numerals raised by 100.

The pistons 131 and 132 in control device 130 are now mounted one behind the other instead of one inside the other. Piston 132 has a projection that keeps it at a certain distance from piston 131. The pressure chambers associated with each piston are labeled 134 and 135.

Instead of the annular grooves 36, 38 and 39, shown in FIG. 1, there is now an auxiliary control valve 27 outside control device 130 that can assume two different states. Valve 27 is shown at rest, and it is maintained in this state by a spring 27a. Valve 27 connects pressure line 44 to a line 147 that empties into front pressure chamber 134. Pressure line 44 is constantly connected to rear pressure chamber 135 by a branch line 148.

Auxiliary control valve 27 can be shifted into its other state against the bias of spring 27a by pressure from line 45, for example. Note that control line 45a branches from line 45 for this purpose. The force of spring 27a is selected so that even the low level of pressure associated with a low braking moment will be enough to close valve 27 (shifting valve 27 to the left in FIG. 2), separating front pressure chamber 134 from pressure line 44 and connecting it instead to line 45.

The system of FIG. 2 functions similarly to that illustrated in FIG. 1. When the brake is idling and the command for a low braking moment is received, pressure will be applied to both of chambers 134 and 135, pistons 131 and 132 will both travel all the way to the left, and intake valve 17 will open completely. As soon as the braking moment exceeds a predetermined low level, the pressure arriving over line 45 will trigger valve 27. If the pressure in line 45 now remains at a low level that corresponds to the low braking moment, front pressure chamber 134 will discharge, so that spring 17a will close intake valve 17 approximately half-way. Otherwise, valve 17 will remain completely open.

In a departure from FIG. 2 (but not illustrated in FIG. 2), valve 27 can also be triggered by pressure derived from pressure line 44 even through a throttle 49 of the type shown in FIG. 1 to which a check valve 51 is connected in parallel. The throttle 49 and check valve 51 shown in FIG. 1 can, on the other hand, be left out if pressure chamber 135 is supplied with pressure medium from the line 45 that comes from brake 10 instead of from pressure line 44. In this case, however, because the pressure in the brake working chamber is relatively low when only a low braking moment is required, the surface of piston 132 that is supplied with pressure must be larger.

Figure 3:
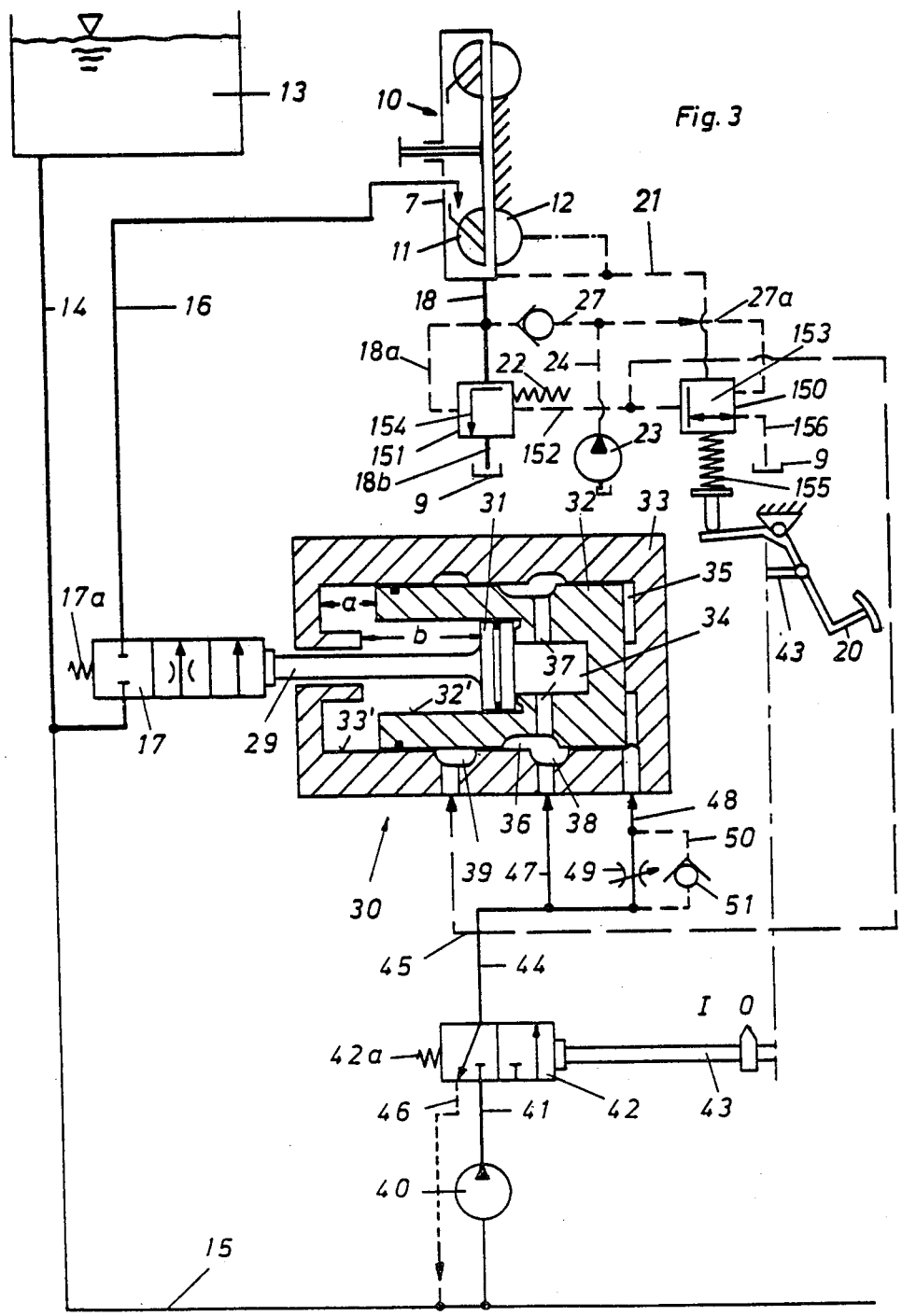

FIG. 3 shows a control system with more advantages than the control system in the embodiment in FIG. 1. Here again, components from FIG. 1 are labeled with the same reference numerals. This Figure provides a detail of the outlet-control valve 19 in FIG. 1 of the type known from DE-OS. It differs from the embodiment in FIG. 1 in that the pressure that arrives at annular channel 39 in hydraulic control device 30 through line 45 does not derive directly from the working chamber of brake 10 but from the connection 152 between a spill valve 151 and a control valve 150. According to the description for the embodiment of FIGS. 1 and 2 of the known DE-OS (corresponding to U.S. Pat. No. 4,276,970) the interaction of the valves 150 and 151 is the following:

The control conduit 18a, drawn in dashed line, is intended to indicate that the hydraulic pressure in the part 18 of the outlet conduit 18, 18b acts on one end of the movable valve body 154 of the overflow valve 151 to move it in the valve "open" direction. The opposite end of the movable valve body 154 of valve 151 is acted on to move it in the opposite "close" direction by a pressure fluid fed via the control conduit 152, aided if necessary by a spring 22. Control conduit 152 is also shown in a dashed line.

The overflow valve 151 is controlled by a regulating valve 150, which has a movable valve member 153 and is connected to the control conduit 152. The desired brake torque in brake 10 is established by the degree of deflection of the brake pedal 20. This deflection acts on the regulating valve 150 through a spring 155 to move the valve 150 in the "close" direction. As a result, the overflow valve 151 also remains closed since the force exerted in the "close" direction by the pressure in the control conduit 152 and by the spring 22 exceeds the force in the "open" direction exerted by the hydraulic pressure in the outlet conduit 18 (control conduit 18a). Thus, the degree of filling of the brake housing 7 increases and the brake torque in the brake 10 rises. As the speed of rotation of the brake rotor 11 decreases, the actual brake torque of brake 10 would decrease. To increase actual brake torque, more working fluid is pumped into brake 10.

The brake torque in brake 10 is measured via measurement of the pressure in the pressure conduit 21 to the regulating valve 150, where the pressure in conduit 21 acts on the movable valve member 153, contrary to the force exerted by the spring 155. The spring 155 is of such a srength that as long as the brake torque in the brake 10 is less than what is required, the force exerted on the movable valve member 153 of valve 150 by the fluid in measurement conduit 21 will be less than that exerted by spring 155, and the spring 155 will keep valve 150 closed. As the pressure on pedal 20 increases, the force exerted by spring 155 increases and this will increase the fluid pressure in conduit 21 that is required to open the valve 150. As a result, the fluid in conduit 152 is unable to leave conduit 152, and this will keep valve 151 closed, allowing the brake 10 to continue filling, and this causes the brake torque in the brake 10 to rise.

When the force exerted on the movable valve member 153 of valve 150 through conduit 21 exceeds the force exerted by spring 155, then, to the extent of that excess, valve 150 is opened. This allows fluid to pass through the valve 150 from conduit 152 to a sump 9 or another suitable low-pressure region via relief conduit 156. The loss of fluid from conduit 152 reduces the force acting on the valve body 154 of the overflow valve 151 sufficiently so that the overflow valve 151 is opened to a certain extent. This allows fluid to drain from the brake 10 via outlet conduit 18, until the force exerted on the valve body of valve 150 by the fluid in the conduit 21 becomes equal to that exerted by spring 155, at which point the desired braking torque in brake 10 is achieved.

The measurement conduit 21 can be connected to the housing 7 of the brake 10 or, as indicated by the dot-dash line can be connected within the region of the stator 12 directly to the toroidal working chamber of the brake.

The pressure fluid is supplied to control conduit 152 through the regulating valve 150. For this, the flows in conduit 24 and 27 are combined in a feed conduit 27a, which discharges into the regulating valve 150. In this way, the control conduit 152 is only supplied with pressure fluid as long as the measurement pressure in conduit 21 is lower than desired. If the pressure in conduit 21 becomes too high, then a portion of the fluid in control conduit 152 is discharged via conduit 156. As a result, the brake 10 reacts very fast.

The hydrodynamic brake of FIG. 1 has a particular characteristic, which that of FIG. 3 overcomes. In the FIG. 1 embodiment, when a maximum braking moment command is followed by a low braking moment command, the braking action does not drop to the level that has been commanded. The reason is that, during the maximum command, intake valve 17 is completely open and the brake builds up maximum pressure in the working chamber, so that, as described above, valve 17 will be kept completely open. If a low moment command is received, at high vehicular speed, for example, neither the oil circulation prevailing at that time nor the pressure in the brake will break down as commanded because of the completely open state of the intake valve and the cross-section ratios in the outlet-control valve. The lower braking action will not be introduced through the half-open intake valve 17 until pedal 20 has been released and a new low braking moment command has been received.

The foregoing characteristic is eliminated in accordance with FIG. 3 by applying to pressure chamber 34, not the pressure from the brake working chamber, but the variable pressure that control valve 150 applies through line 152 to spill valve 151. This arrangement makes it possible to establish a low braking moment in the hydrodynamic brake subsequent to a command for a high braking moment, even at high vehicular speeds.

Although the present invention has been described in connection with several preferred embodiments thereof, many variations and modifications will now become apparent to those skilled in the art. It is preferred, therefore, that the present invention be limited, not by the specific disclosure herein, but only by the appended claims.

What is claimed is:

1. A hydrodynamic torque transfer unit, comprising: a housing with a working chamber; a stator in the working chamber; a rotor rotatably held in the working chamber, rotatable with respect to the stator and positioned with respect to the stator for torque transfer therebetween in the presence of working fluid in the working chamber;

a working fluid inlet to the working chamber and a working fluid outlet from the working chamber, such that the selective filling of the working chamber through the inlet and the removal of working fluid therefrom through the outlet establishes the torque to be transferred through the working chamber;

an inlet valve connected to the inlet for regulating the amount of working fluid to pass through the inlet; the valve having a fully open condition at which it permits passage to the inlet of a larger rate of flow of working fluid and having a partially open condition at which it permits passage to the inlet of a smaller rate of flow of working fluid;

a control device connected to the valve for moving the valve through its conditions; the control device comprising a first control element connected with the valve for moving the valve, and the first control element being movable from a rest position, through an intermediate activated position at which the valve is in the partially open condition, to a fully activated position at which the valve is in the fully open condition;

a first pressure chamber behind the first control element such that when the first control element is in the rest position and the first pressure chamber is pressurized, the first control element is initially driven to the fully activated condition;

a change over device having a pressurizing condition at which it connects the first pressure chamber to a source of pressure medium for first pressurizing the first pressure chamber to move the first control element to the fully activated position; the change over device having a non-pressurizing condition at which it connects the first pressure chamber with the pressure in the working chamber, whereby the pressure in the working chamber acts upon the first pressure chamber, for thereafter discharging the pressure of the first pressure chamber, when the pressure in the working chamber is low enough to enable such discharge, and the discharge from the first pressure chamber being for causing the return of the first control element toward the rest position thereof;

the change over device including preventing means for preventing the return of the first control element beyond the intermediate activated position toward the rest position;

an activator operable both for causing pressurization of the first pressure chamber with the change over device in the pressurizing condition and for causing operation of the change over device to the non-pressurizing condition thereof.

2. The hydrodynamic torque transfer unit of claim 1, wherein the preventing means of the change over device is in position to prevent return of the first control element beyond the intermediate activated position when the change over device is in the non-pressurizing condition.

3. The hydrodynamic torque transfer unit of claim 2, wherein the preventing means is moved to the preventing position together with the change over device when the change over device is in the non-pressurizing condition.

4. The hydrodynamic torque transfer unit of claim 1, further comprising means for biasing the inlet valve to the partially open condition thereof when the change over device is in the non-pressurizing condition thereof, and the biasing means being strong enough to bias the valve when the working chamber is at a lower pressure relative to the pressure in the first chamber and the biasing means not being strong enough to bias the valve when the pressure in the working chamber is at a higher pressure relative to the pressure in the first pressure chamber.

5. The hydrodynamic torque transfer unit of claim 1, further comprising an outlet control for the working chamber outlet, and the first pressure chamber being connected with the working chamber through the outlet control.

6. The hydrodynamic torque transfer unit of claim 1, wherein in the non-pressurizing condition thereof, the change over device connects the first pressure chamber with the working chamber.

7. The hydrodynamic torque transfer unit of claim 6, wherein the inlet valve also has a closed condition at which the inlet valve blocks working fluid flow to the working chamber; at the rest condition of the control device, the control device holding the valve in the closed condition thereof.

8. The hydrodynamic torque transfer unit of claim 7, wherein the first control element moves from the rest position over a shorter stroke to the intermediate activated position thereof and over a longer stroke to the fully activated position thereof.

9. The hydrodynamic torque transfer unit of claim 8, wherein the preventing means of the change over device is in position to prevent return of the first control element beyond the intermediate activated position when the change over device is in the non-pressurizing condition.

10. The hydrodynamic torque transfer unit of claim 9, further comprising means for causing the preventing means to move to the position for preventing return of the first control element toward the rest position thereof only after the first control element moves to the fully activated condition thereof.

11. The hydrodynamic torque transfer unit of claim 10, further comprising a second pressure chamber behind the change over device and connectable with a source of pressure medium, wherein pressurization of the second pressure chamber drives the change over device from the pressurizing condition to the non-pressurizing condition thereof.

12. The hydrodynamic torque transfer unit of claim 11, further comprising means for slowing delivery of pressure to the second pressure chamber, as contrasted with delivery of pressure to the first pressure chamber.

13. The hydrodynamic torque transfer unit of claim 7, further comprising means for biasing the inlet valve to the partially open condition thereof when the change over device is in the non-pressurizing condition thereof, and the biasing means being strong enough to bias the valve when the working chamber is at a lower pressure relative to the pressure in the first chamber and the biasing means not being strong enough to bias the valve when the pressure in the working chamber is at a higher pressure relative to the pressure in the first pressure chamber.

14. The hydrodynamic torque transfer unit of claim 13, wherein the biasing means is selected with a strength for being in equilibrium with a pressure in the first pressure chamber and which corresponds to a mean value of the torque transferred by the hydrodynamic torque transfer unit.

15. The hydrodynamic torque transer unit of claim 7, further comprising a second pressure chamber behind the change over device and connectable with a source of pressure medium, wherein pressurization of the second pressure chamber drives the change over device from the pressurizing condition to the non-pressurizing condition thereof.

16. The hydrodynamic torque transfer unit of claim 15, further comprising an outlet control for the working chamber outlet, and the first pressure chamber being connected with the working chamber through the outlet control.

17. The hydrodynamic torque transfer unit of claim 15, further comprising meas for continuously connecting the second pressure chamber to the source of pressure medium once the activator begins operating.

18. The hydrodynamic torque transfer unit of claim 15, further comprising means for slowing delivery of pressure to the second pressure chamber, as contrasted with delivery of pressure to the first pressure chamber.

19. The hydrodynamic torque transfer unit of claim 15, wherein the preventing means of the change over device is in position to prevent return of the first control element beyond the intermediate activated position when the change over device is in the non-pressurizing condition.

20. The hydrodynamic torque transfer unit of claim 19, further comprising an outlet control for the working chamber outlet, and the first pressure chamber being connected with the working chamber through the outlet control.

21. The hydrodynamic torque transfer unit of claim 1, wherein the inlet valve also has a closed condition at which the inlet valve blocks working fluid flow to the working chamber; at the rest condition of the control device, the control device holding the valve in the closed condition thereof.

22. A hydrodynamic torque transfer unit, comprising:
a housing with a working chamber; a stator in the working chamber; a rotor rotatably held in the working chamber rotatable with respect to the stator and positioned with respect to the stator for torque transfer therebetween in the presence of working fluid in the working chamber;
a working fluid inlet to the working chamber and a working fluid outlet from the working chamber, such that the selective filling of the working chamber through the inlet and the removal of working fluid therefrom through the outlet establishes the torque to be transferred through the working chamber;
an inlet valve connected to the inlet for regulating the amount of working fluid to pass through the inlet; the valve having a fully open condition at which it permits passage to the inlet of a larger rate of flow of working fluid and having a partially open condition at which it permits passage to the inlet of a smaller rate of flow of working fluid;
a control device connected to the valve for moving the valve through its condition; the control device comprising a piston connected with the valve for moving the valve, the piston being movable from a rest position, through an intermedite position at which the valve is in the partially open condition thereof to an activated position at which the valve is in the fully open condition;
a first pressure chamber behind the piston such that when the piston is in the rest position thereof and the first pressure chamber is pressurized, the piston is initially driven to the fully activated position thereof;
a change over device for first pressurizing the first pressure chamber to move the first piston to the fully activated position and for thereafter causing the discharge of the first pressure chamber for causing return of the first piston toward the rest position thereof; the change over device comprising a second piston behind the first piston and the first pressure chamber being defined between the first and second pistons; the second piston being movable between a respective second piston rest position, which frees the first piston to move through all the positions thereof, and a prevent position, where the first piston moves to abut the second piston and where the second piston then prevents the first piston from retreating further past the intermediate activated position thereof from the fully activated position thereof;
a second pressure chamber behind the second piston and being connectable with a source of pressure medium, wherein pressurization of the second pressure chamber drives the second piston from the second rest position thereof to the prevent position thereof;
first conduit means in the second piston for transmitting pressure from a source of pressure medium to the first pressure chamber when the second piston is in the second rest position thereof; the second piston being so shaped that when it is moved out of the second rest position thereof, it breaks off the communication between the source of pressure medium and the first pressure chamber; second conduit means in the second piston for communicating with the first pressure chamber when the second piston has moved to the prevent position; the second conduit means communicating with the working chamber, whereby when the second piston is in the prevent position thereof, the first pressure chamber communicates with the pressure in the working chamber, and when the pressure in the working chamber is low enough, the first pressure chamber discharges through the second conduit means;
an activator for connecting the source of pressure with both the first pressure chamber and with the second pressure chamber.

23. The hydrodynamic torque transfer unit of claim 22, wherein the inlet valve also has a closed condition at which the inlet valve blocks fluid flow to the working chamber; at the rest position of the first piston, the first piston holds the valve in the closed condition thereof.

24. The hydrodynamic torque transfer unit of claim 23, wherein the first piston moves from the rest position thereof over a shorter stroke to the intermediate activated position thereof and over a longer stroke to the fully activated position thereof.

25. The hydrodynamic torque transfer unit of claim 24, further including means for biasing the inlet valve to the partially open condition thereof when the second piston has moved to the prevent position thereof, and the biasing means being strong enough to bias the inlet valve when the working chamber is at a relatively lower pressure and not being strong enough to bias the inlet valve when the working chamber is at a relativey higher pressure.

26. The hydrodynamic torque transfer unit of either of claims 22 or 25, further comprising means for delaying the movement of the second piston to the prevent position thereof until after the first piston has moved to the fully activated position thereof.

27. The hydrodynamic torque transfer unit of claim 26, wherein the means for delaying movement of the second piston comprises means for slowing delivery of pressure to the second pressure chamber, as contrasted with the rate of delivery of pressure to the first pressure chamber.

* * * * *